(12) United States Patent
Graichen

(10) Patent No.: US 11,280,414 B2
(45) Date of Patent: Mar. 22, 2022

(54) PLUG VALVE HARD SEALS ON CYLINDER WALL

(71) Applicant: Hanon Systems, Daejeon (KR)

(72) Inventor: Brian Graichen, Leonard, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 16/939,270

(22) Filed: Jul. 27, 2020

(65) Prior Publication Data

US 2022/0025976 A1    Jan. 27, 2022

(51) Int. Cl.
*F16K 5/04* (2006.01)
*F16K 11/085* (2006.01)
*F16K 5/06* (2006.01)

(52) U.S. Cl.
CPC .......... *F16K 5/0471* (2013.01); *F16K 5/0678* (2013.01); *F16K 5/0689* (2013.01); *F16K 11/0853* (2013.01)

(58) Field of Classification Search
CPC ...... F16K 5/0678; F16K 5/0689; F16K 5/181; F16K 5/0471; F16K 5/161; F16K 5/201; F16K 5/0271; F16K 11/0853; F16K 11/0833; F16K 11/0873
See application file for complete search history.

(56) References Cited

U.S. PATENT DOCUMENTS

| | | | | |
|---|---|---|---|---|
| 3,061,267 A | * | 10/1962 | Hamer | F16K 5/0471 251/172 |
| 3,916,943 A | | 11/1975 | Hester et al. | |
| 4,331,172 A | * | 5/1982 | D'Angelo | F16K 5/08 137/72 |
| 4,572,515 A | * | 2/1986 | Grazioli | F16K 5/0673 251/317 |
| 4,762,301 A | * | 8/1988 | Wozniak | F16K 5/0642 251/171 |

(Continued)

FOREIGN PATENT DOCUMENTS

| | | |
|---|---|---|
| CN | 201502748 U | 6/2010 |
| JP | S5015425 U | 2/1975 |

(Continued)

OTHER PUBLICATIONS

"Excerpt 8.4 from Tribological aspect in friction stir and welding by V.N. Malyshev in Friction Coefficient" by "Science Direct" (pp. 10-11, publicly available since 2014) (Year: 2014).*

(Continued)

*Primary Examiner* — David Colon-Morales
(74) *Attorney, Agent, or Firm* — Shumaker, Loop & Kendrick, LLP; James D. Miller

(57) ABSTRACT

A rotary valve includes a valve body including an opening formed therein, a rotary component received within the opening of the valve body with the rotary component configured to rotate relative to the valve body about an axis of rotation thereof, and a sealing assembly including a hard sealing structure and a soft sealing structure disposed between the valve body and the rotary component. The hard sealing structure is formed from a substantially rigid material and is configured to sealingly engage the rotary component. The soft sealing structure is formed from a resiliently deformable material and is configured to sealingly engage the hard sealing structure and the valve body.

18 Claims, 8 Drawing Sheets

(56) References Cited

U.S. PATENT DOCUMENTS

| | | | | |
|---|---|---|---|---|
| 4,795,133 | A * | 1/1989 | Berchem | F16K 5/0657 |
| | | | | 251/171 |
| 6,655,658 | B2 * | 12/2003 | Neal | F16K 5/0471 |
| | | | | 251/309 |
| 10,203,044 | B2 * | 2/2019 | Dieterich | F16K 11/0856 |
| 10,359,138 | B2 * | 7/2019 | Bareis | F16J 15/025 |
| 10,883,619 | B2 * | 1/2021 | Smith | F16K 5/0471 |
| 11,047,492 | B2 * | 6/2021 | Kawamoto | F16K 5/0673 |
| 2001/0045231 | A1 * | 11/2001 | Monod | F16K 11/0873 |
| | | | | 137/454.2 |
| 2010/0200791 | A1 * | 8/2010 | Yung | F16K 5/0673 |
| | | | | 251/172 |
| 2019/0078692 | A1 * | 3/2019 | Bonomi | F16K 11/0873 |
| 2020/0300516 | A1 * | 9/2020 | Wang | F16K 11/0876 |
| 2020/0318750 | A1 * | 10/2020 | Beisel | F16K 27/065 |
| 2021/0010604 | A1 * | 1/2021 | Murakami | F16K 11/085 |
| 2021/0199203 | A1 * | 7/2021 | Dubois | F16K 5/0668 |

FOREIGN PATENT DOCUMENTS

| | | |
|---|---|---|
| JP | S53128928 U | 10/1978 |
| JP | 0600772 U | 2/1994 |
| JP | 06008873 U | 2/1994 |
| JP | 2005308165 A | 11/2005 |
| WO | WO-2017173292 A1 * | 10/2017 ........... F16K 5/0471 |

OTHER PUBLICATIONS

"TECATRON® PPS" by "Ensinger" (p. 1, publically available since 2016) (Year: 2016).*

* cited by examiner

PLUG VALVE HARD SEALS ON CYLINDER WALL

FIELD OF THE INVENTION

The invention relates to a seal assembly for a rotary valve, and more particularly, a seal assembly including each of a soft seal and a hard seal for ensuring a relatively low friction and fluid-tight seal between an inner surface of a stationary valve body and an outer surface of a rotary component.

BACKGROUND

A plug valve typically includes a "plug" having a substantially cylindrical or conical outer surface that is received within a valve body having a corresponding cylindrical or conical inner surface. The plug typically includes at least one passageway formed therethrough with at least one of the ends of each of the passageways intersecting the outer surface of the plug. Each of the passageways is configured to communicate a fluid through the plug with respect to any of a variety of different flow configurations. The valve body in turn typically includes one or more ports intersecting the inner surface of the valve body in order to communicate the fluid between any combination of the ports of the valve body and the passageways of the plug. The plug is operatively connected to a rotary actuator configured to rotate the plug relative to the stationary valve body to cause a repositioning of each of the passageways relative to each of the stationary ports. Depending on the configuration of the plug and the valve body, such rotation of the plug relative to the valve body may switch which of the passageways are placed in fluid communication with the corresponding ports or may cease flow through at least one of the passageways by placing the at least one of the passageways in alignment with a portion of the inner surface of the valve body devoid of one of the ports.

The manner in which the plug rotates relative to the valve body requires that a suitable fluid-tight seal is established between the outer surface of the plug and the inner surface of the valve body to ensure that the corresponding fluid does not leak into a relatively small cylindrical or conical gap that may be present between the plug and valve body to allow for the ease of rotation of the plug relative to the valve body. Traditionally, such seals are established by placing a sealing element on the inner surface of the valve body around a periphery of each of the ports. Each of the sealing elements is typically formed from a relatively soft and resilient material capable of being compressed between the inner surface of the valve body and the outer surface of the plug to ensure that a suitable sealing effect is maintained regardless of the rotational position of the plug. The material may be an elastomeric material, for example.

Unfortunately, such sealing elements present a disadvantageous relationship wherein an increase in the sealing effect between the plug and the valve body also tends to increase the amount of torque required to rotate the plug relative to the valve body. This occurs because the amount of compression applied to such a sealing element in a radial direction of the plug valve relates directly to the sealing effect provided thereby. As the degree of compression is increased, a radial force present between an inner surface of the sealing and the outer surface of the plug also increases. This increased radial force increases the frictional forces present between the sealing element and the outer surface of the plug with respect to a circumferential direction of the plug, which in turn increases the amount of torque required to overcome such frictional forces when rotating the plug relative to the valve body. Accordingly, the type of rotary actuator capable of supplying the desired degree of sealing effect for a given plug valve configuration may be limited to only those rotary actuators having a corresponding torque rating, which leads to such rotary actuators being more costly while also requiring greater power to operate in the desired manner.

Accordingly, there exists a need in the art to produce a sealing element that can provide a desired degree of sealing effect without requiring a corresponding increase in the amount of torque required to rotate the plug relative to the associated valve body.

SUMMARY OF THE INVENTION

According to an embodiment of the present invention, a sealing assembly for use with a rotary valve having a rotary component configured to rotate relative to a valve body is disclosed. The sealing assembly comprises a hard sealing structure configured to sealingly engage the rotary component. The hard sealing structure is formed from a substantially rigid material. A soft sealing structure is configured to sealingly engage the hard sealing structure and the valve body. The soft sealing structure is formed from a resiliently deformable material.

According to another embodiment of the present invention, a rotary valve is disclosed. The rotary valve includes a valve body including an opening formed therein, a rotary component received within the opening of the valve body with the rotary component configured to rotate relative to the valve body about an axis of rotation thereof, and a sealing assembly including a hard sealing structure and a soft sealing structure disposed between the valve body and the rotary component. The hard sealing structure is formed from a substantially rigid material and is configured to sealingly engage the rotary component. The soft sealing structure is formed from a resiliently compressible material and is configured to sealingly engage the hard sealing structure and the valve body.

DETAILED DESCRIPTION OF THE INVENTION

Figure 1:
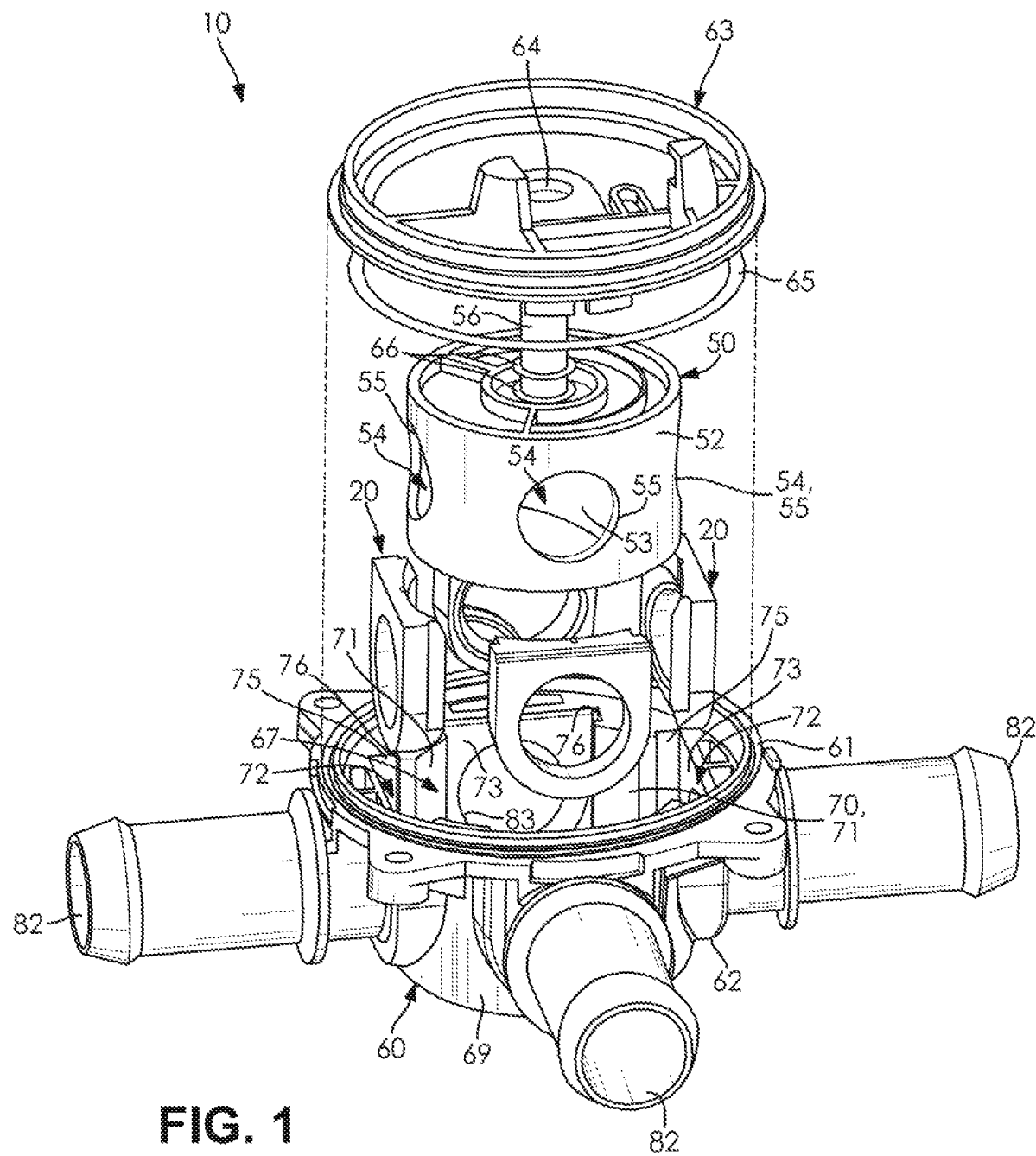
FIG. 1 is an exploded perspective view of a rotary valve utilizing a plurality of novel sealing assemblies according to an embodiment of the present invention.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-6 illustrate a rotary valve 10 utilizing at least one improved seal assembly 20 according to an embodiment of the present invention. The illustrated rotary valve 10 may alternatively be referred to as a "plug valve," as desired. The rotary valve 10 as shown and described herein may also be utilized for any number of different applications and for selectively conveying any variety of different fluids therethrough. The presently disclosed rotary valve 10 may be utilized in automotive applications, for example, including the control of various fluids associated with operation of a hydraulic system, a pneumatic system, a fuel system, or a heating, ventilating, and air conditioning (HVAC) system of the associated vehicle. The fluids suitable for use with the rotary valve 10 may be air, any hydraulic fluids, any types of fuel, any refrigerants, or any coolants typically utilized with respect to such vehicular systems, as desired. However, it should also be apparent that the present rotary valve 10 may be adapted for use with any fluid associated with any fluid conveying system without necessarily departing from the scope of the present invention.

The rotary valve 10 disclosed in FIGS. 1-6 generally includes a rotary component 50 (plug), a valve body 60, and at least one seal assembly 20 for providing a fluid-tight seal between the rotary component 50 and the valve body 60. The disclosed rotary valve 10 includes a substantially cylindrical rotary component 50 and a substantially cylindrical valve body 60. The rotary component 50 is configured to rotate relative to the valve body 60 about an axis of rotation thereof. The axis of rotation of the rotary component 50 extends through a center of the rotary component 50 and defines an axial direction thereof. The axis of rotation of the rotary component 50 also coincides with a central axis of the valve body 60 as well as the rotary valve 10 more generally, hence subsequent references to an axial direction of any of the rotary valve 10, the rotary component 50, or the valve body 60 refer to directions arranged parallel to the axis of rotation of the rotary component 50. Additionally, a radial direction of any one of the rotary valve 10, the rotary component 50, or the valve body 60 may refer to any of the directions passing through and arranged perpendicular to the axis of rotation of the rotary component 50.

The rotary component 50 illustrated in FIGS. 1-4 includes an outer circumferential surface 52 having a cylindrical shape. At least one passageway 54 is formed through the rotary component with at least one end 55 of at least one of the passageways 54 intersecting the outer circumferential surface 52 of the rotary component 50. Depending on the flow configuration of the rotary valve 10, each of the ends 55 of each of the passageways 54 may represent an inlet or an outlet into the corresponding passageway 54. In the provided embodiment, the rotary component 50 includes two of the passageways 54 with each of the opposing ends 55 of each of the two passageways 54 intersecting the outer circumferential surface 52 at positions circumferentially spaced from each other by 90 degrees. The rotary component 50 is shown as including a divider 53 separating the two different passageways 54 from each other to cause each of the ends 55 to be in fluid communication with an adjacent one of the ends 55 through an interior of the rotary component 50 while fluidly separated from the remaining two ends 55 of the other of the passageways 54. One skilled in the art should appreciate that alternative configurations of the passageways 54 may be utilized so long as the at least one of the ends 55 of one of the passageways 54 intersects the outer circumferential surface 52 of the rotary component 50 in a manner requiring the sealing thereof relative to the surrounding valve body 60. Alternative configurations of the passageways 54 may include at least one of the passageways 54 branching from one end 55 thereof to two or more separate ends 55 for establishing a 1-2, a 1-3, or a 2-3 (and so on) flow configuration through the rotary component 50. Additionally, in some configurations, one end 55 of at least one of the passageways 54 may intersect the outer circumferential surface 52 while at least one of the fluidly coupled ends 55 intersects an axial end surface of the rotary component 50 to cause the fluid to flow from a radial direction of the rotary component 50 to an axial direction of the rotary component 50 while turning 90 degrees. Such a configuration is illustrated with reference to the embodiment of the invention shown in FIGS. 11-14, which is described in greater detail hereinafter.

In the embodiment shown in FIGS. 1-4, each of the ends 55 of each of the passageways 54 includes a substantially circular profile shape when viewed through a center of each of the ends 55 with respect to a corresponding radial direction of the rotary component 50. Additionally, each of the ends 55 may include a substantially arcuate or hyperbolic profile shape when viewed from a tangential direction of the rotary component 50 which is arranged perpendicular to the corresponding radial direction thereof. Each of the ends 55 further includes the profile shape of an arc of a circle when viewed from the axial direction of the rotary component 50. The arcuate shape and the shape of the arc of a circle are present due to the manner in which each of the ends 55 extends around the cylindrical shape of the outer circumferential surface 52. However, each of the ends 55 of each of the passageways 54 may include any profile shape from the radial and tangential directions while remaining within the scope of the present invention. For example, one of the ends 55 may instead include a square radial profile shape and a corresponding rectangular tangential profile shape, as one alternative and non-limiting example. As explained hereinafter, the configuration of each of the sealing assemblies 20 used to provide the fluid-tight seal around a periphery of each of the ends 55 of each of the passageways 54 may be adapted to the corresponding peripheral shape in order to fully surround each of the ends 55 for preventing a leakage of the corresponding fluid in any given direction around the periphery of each of the ends 55 of the passageways 54.

Figure 2:
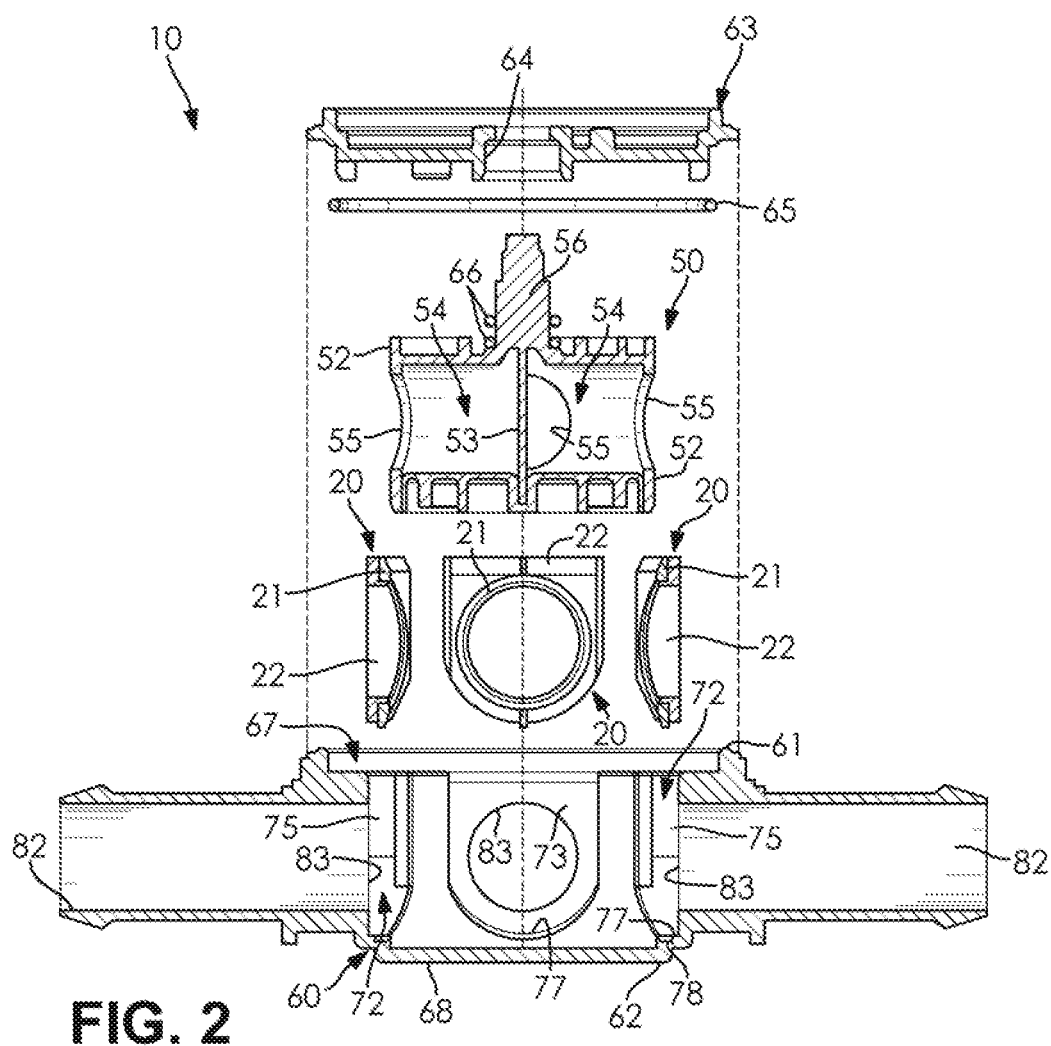
FIG. 2 is an exploded cross-sectional elevational view of the rotary valve of FIG. 1 taken through a plane parallel to an axis of rotation of a rotary component of the rotary valve.
Figure 3:
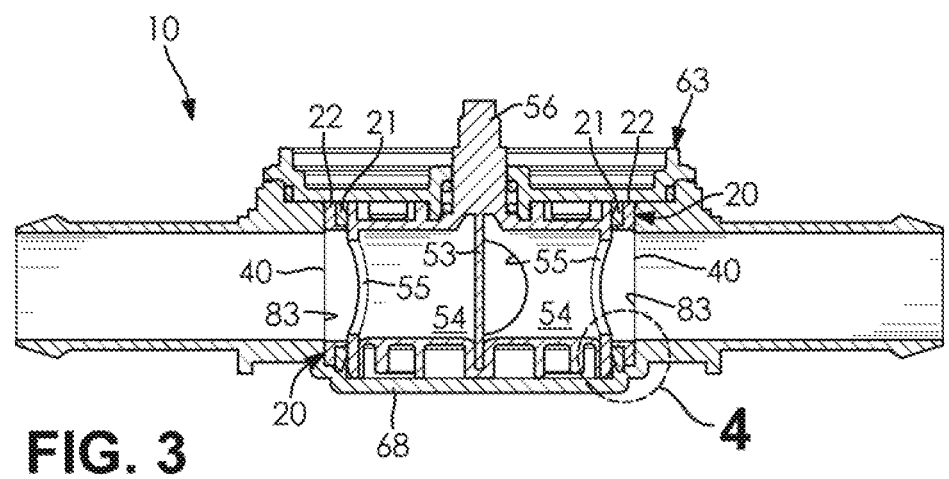
FIG. 3 is a cross-sectional elevational view of the rotary valve when fully assembled taken along the same plane as FIG. 2.

The rotary component 50 is operably coupled to a rotary motor or actuator (not shown) configured to provide a torque necessary to rotate the rotary component 50 about the axis of rotation thereof relative to the stationary valve body 60. The rotary motor or actuator may be a torque motor, a servo motor, an electric stepper motor, or a brushless DC motor, as non-limiting examples. Any rotary motor or actuator having the necessary torque and the preciseness for establishing a desired rotational position of the rotary component 50 relative to the valve body 60 may be selected without departing from the scope of the present invention. As shown in FIGS. 1-3, the rotary component 50 may include an axially extending stem 56 disposed along the axis of rotation thereof for operationally engaging the corresponding rotary motor of actuator.

The valve body 60 extends axially from a first end 61 to a second end 62 thereof. The first end 61 of the valve body 60 is configured to receive a cover 63 after the valve body 60 has axially received the rotary component 50 and each of the corresponding seal assemblies 20 therein, as explained in greater detail hereinafter. The cover 63 includes an opening 64 centered on the axis of rotation of the rotary component 50 with the opening 64 configured to receive the stem 56 of the rotary component 50 therethrough. An O-ring 65 is disposed between the first end 61 of the valve body 60 and an inner axial surface of the cover 63 to form a fluid-tight seal therebetween. Another pair of O-rings 66 is received between an inner circumferential surface of the cover 63 defining the opening 64 thereof and an outer circumferential surface of the stem 56 of the rotary component 50 to similarly form a fluid-tight seal therebetween, including during periods of rotation of the rotary component 50 relative to the valve body 60.

The valve body 60 includes a least one fluid port 82 for communicating a fluid to the rotary component 50, wherein each of the fluid ports 82 forms a hollow passageway through the valve body 60 through which the corresponding fluid may be conveyed towards or away from the rotary component 50. In the illustrated embodiment, the valve body 60 includes four of the fluid ports 82 spaced equally from each other with respect to a circumferential direction of the valve body 60 to cause each of the fluid ports 82 to point radially towards or away from the axis of rotation of the rotary component 50 in a direction circumferentially spaced 90 degrees from each of the adjacent fluid ports 82. The 90 degrees of circumferential displacement between the adjacent ones of the fluid ports 82 allows for each of the fluid ports 82 to correspond in position to each of the ends 55 of each of the passageways 54 formed through the rotary component 50 when the rotary component 50 is rotated to a desired operation position. However, it should be apparent to one skilled in the art that the valve body 60 may include as few as one radially extending fluid port 82 or any number of circumferentially spaced fluid ports 82 while remaining within the scope of the present invention, and especially in accordance with any variation to the configuration of the passageways 54 formed through the corresponding rotary component 50 from that shown in FIGS. 1-4.

The valve body 60 further includes an opening 67 formed therein with the opening 67 extending from the first end 61 of the valve body 60 towards the second end 62 thereof with respect to the axial direction. The opening 67 defines each of an axial end wall 68 and a circumferential wall 69 of the valve body 60. The axial end wall 68 is configured to engage an axial end of the rotary component 50 and the circumferential wall 69 is configured to surround the rotary component 50 when the rotary component 50 is rotatably received within the valve body 60 in the axial direction of the rotary valve 10.

The circumferential wall 69 of the valve body 60 includes an inner circumferential surface 70 extending peripherally around the rotary component 50 as defined by the opening 67. The inner circumferential surface 70 includes a plurality of cylindrical segments 71 and a plurality of pockets 72 interposed between adjacent ones of the cylindrical segments 71. When viewed from the axial direction of the valve body 60, each of the cylindrical segments 71 may include the shape of an arc of a circle having substantially the same radius of curvature as the circular profile shape of the outer circumferential surface 52 of the rotary component 50. As such, the outer circumferential surface 52 of the rotary component 50 substantially corresponds to the shape of each of the cylindrical segments 71 regardless of the instantaneous rotational position of the rotary component 50 relative to the valve body 60.

Each of the pockets 72 is indented in the radial outward direction of the rotary valve 10 into the circumferential wall 69 relative to each of the adjoining cylindrical segments 71. Each of the pockets 72 is shaped to receive one of the sealing assemblies 20 therein, and hence each of the pockets 72 corresponds to a position of one of the circumferentially spaced fluid ports 82 of the valve body 60 in need of sealing via one of the sealing assemblies 20.

In the provided embodiment, each of the pockets 72 includes a radial end surface 73 arranged parallel to a tangential direction of a radially aligned portion of the rotary component 50. The radial end surface 73 of each of the pockets 72 illustrated in FIGS. 1-4 is substantially planar in configuration, but it should be apparent to one skilled in the art that the radial end surface 73 may have any shape, including a cylindrical shape having a larger radius of curvature than the adjacent cylindrical segments 71, without necessarily departing from the scope of the present invention.

The radial end surface 73 of each of the pockets 72 intersects a radial innermost end 83 of a corresponding one of the fluid ports 82. As can be seen in FIGS. 1-3, the radial innermost end 83 of each of the fluid ports 82 may include a size and profile shape substantially corresponding to the size and profile shape of each of the ends 55 of the passageways 54 intersecting the outer circumferential surface 52 of the rotary component 50. The similar sizes and shapes of the radial innermost end 83 of each of the fluid ports 82 and the corresponding radial outermost end 55 of each of the passageways 54 may be selected to prevent a substantial change in pressure of the fluid communicated through the rotary valve 10 as could occur if substantial changes in direction or substantial changes in flow area were to be present therebetween. In the present embodiment, the radial innermost end 83 of each of the fluid ports 82 includes a circular profile shape to match the circular profile shape of each of the ends 55 of the passageways 54 intersecting the outer circumferential surface 52 of the rotary component 50.

Each of the pockets 72 further includes a pair of opposing lateral surfaces 75 arranged perpendicular to the corresponding radial end surface 73 and extending in the axial direction of the valve body 60. A radial innermost end of each of the lateral surfaces 75 includes a retaining shoulder 76 adjacent one of the adjoining cylindrical segments 71 with each of the retaining shoulders 76 extending in the axial direction of the valve body 60. The retaining shoulders 76 of each of the pockets 72 are configured to aid in maintaining a radial and circumferential position of the corresponding one of the sealing assemblies 20 when received within the corresponding pocket 72.

Each of the pockets 72 further includes an axial end surface 77 arranged perpendicular to the corresponding radial end surface 73 and connecting the corresponding lateral surfaces 75. In the provided embodiment, each of the radial end surfaces 73 includes a semi-cylindrical shape having a larger radius of curvature than the radial innermost end 83 of the corresponding fluid port 72 to space the axial end surface 77 from the corresponding end 83.

Figure 4:
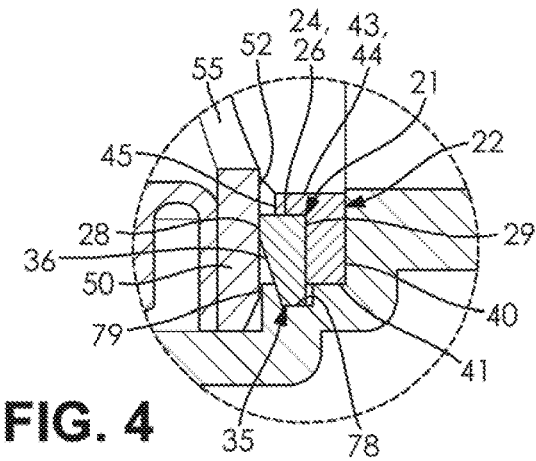
FIG. 4 is an enlarged fragmentary cross-sectional elevational view of the encircled portion of FIG. 3.

As best shown in FIGS. 2-4, each of the axial end surfaces 77 includes a retention indentation 78 formed therein. Each of the retention indentations 78 is indented axially towards the second end 62 of the valve body 60 relative to the surrounding portions of the corresponding axial end surface 77 while being spaced at a position radially outwardly from the outer circumferential surface 52 of the rotary component 50. Each of the retention indentations 78 defines a retention lip 79 disposed immediately adjacent the outer circumferential surface 52 of the rotary component 50. Each of the retention lips 79 is configured to retain a portion of the corresponding sealing assembly 20 during assembly of the rotary valve 10 as described in greater detail hereinafter.

Figure 5:
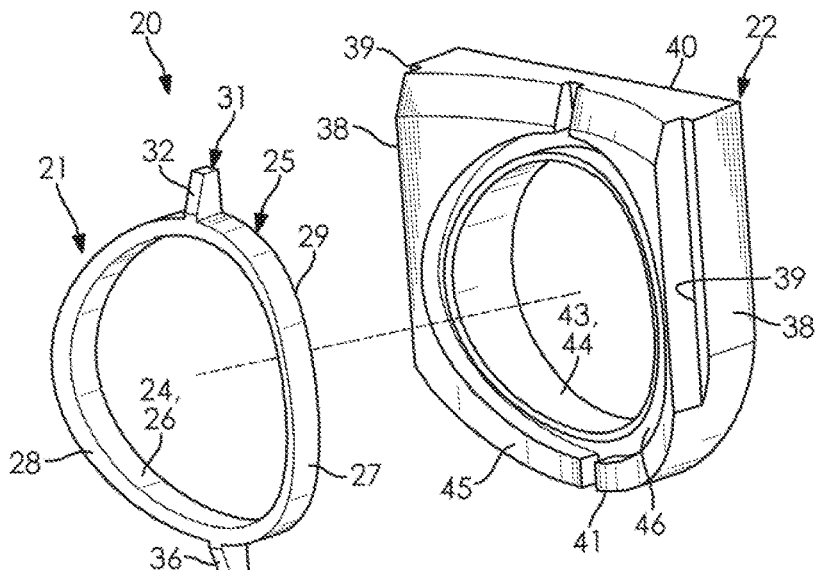
FIG. 5 is an exploded perspective view of one of the sealing assemblies of FIG. 1.
Figure 6:
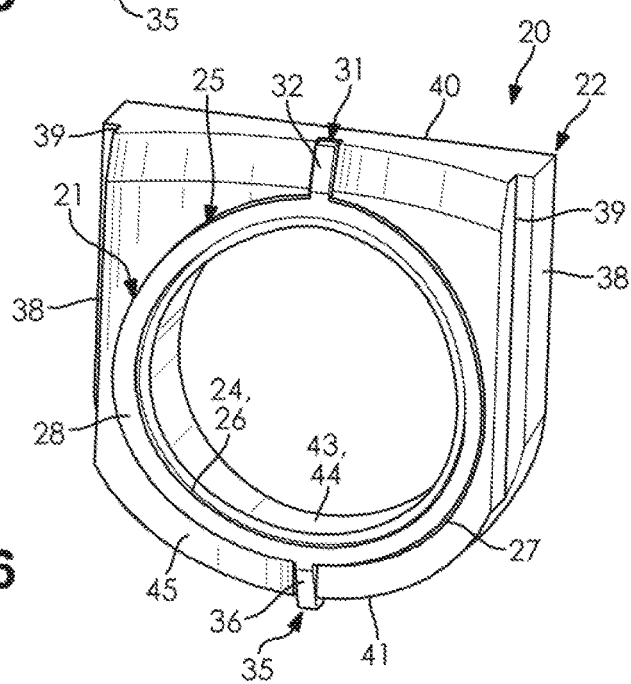
FIG. 6 is a perspective view of the sealing assembly of FIG. 5 shown fully assembled.

FIGS. 5 and 6 illustrate one of the sealing assemblies 20 in isolation to better show the features thereof. The sealing assembly 20 includes a first sealing structure 21 and a second sealing structure 22. The first sealing structure 21 may alternatively be referred to as the "hard" sealing structure 21 while the second sealing structure 22 may alternatively be referred to as the "soft" sealing structure 22, as desired. The hard sealing structure 21 is configured to directly engage the outer circumferential surface 52 of the rotary component 50 to provide a fluid-tight seal therebetween when the rotary component 50 is rotated to any of the different prescribed positions thereof for causing any of the prescribed flow configurations through the rotary valve 10. More specifically, the hard sealing structure 21 is configured to surround and form a flight-tight seal around a periphery of any of the ends 55 of any of the passageways 54 formed through the rotary component 50 and intersecting the outer circumferential surface 52 thereof when the corresponding one of the ends 55 is placed in radial alignment with the hard sealing structure 21. In contrast, the soft sealing structure 22 is configured to directly engage the circumferential wall 69 of the valve body 60 within one of the pockets 72 thereof to provide a fluid-tight seal therebetween. More specifically, the soft sealing structure 22 is configured to surround and form a fluid-tight seal around a periphery of the radial innermost end 83 of the corresponding one of the fluid ports 82 of the valve body 60. Additionally, the hard sealing structure 21 is also configured to engage the soft sealing structure 22 to form a fluid-tight seal therebetween at positions where the sealing structures 21, 22 are placed in direct contact with each other. As such, the sealing assembly 20 provides a fluid-tight seal between the instantaneously aligned one of the ends 55 of one of the passageways 54 formed through the rotary component 50 and the radial innermost end 83 of the fluid port 82 corresponding to the position of the sealing assembly 20 within the valve body 60.

The hard sealing structure 21 includes a circumferentially extending peripheral portion 25 defining a cylindrically shaped flow opening 24 therethough that is substantially circular in profile shape when viewed from the radial direction of the rotary valve 10 extending through a center of the flow opening 24. As used hereinafter, the radial direction of the rotary valve 10 extending through the center of the flow opening 24 also represents a central axis of the hard sealing structure 21, hence references to the axial direction of the hard sealing structure 21 refers to those directions arranged parallel to the described central axis thereof. The flow opening 24 includes a profile size and shape in the axial direction of the hard sealing structure 21 substantially corresponding to that of any of the ends 55 of the passageways 54 formed through the rotary component 50 and capable of axial alignment with the flow opening 24. Again, the corresponding size and shape prevents the generation of an undesired pressure change when the fluid passing through the rotary valve 10 passes between the end 55 of the passageway 54 and the aligned flow opening 24.

The peripheral portion 25 includes an inner circumferential surface 26 defining the flow opening 24 and an outer circumferential surface 27 formed opposite and radially outwardly of the inner circumferential surface 26 relative to the central axis of the hard sealing structure 21. The outer circumferential surface 27 of the peripheral portion 25 includes a circular profile shape when viewed from the axial direction of the hard sealing structure 25 with the outer circumferential surface 27 having a larger radius of curvature than the inner circumferential surface 26 as measured from the central axis of the hard sealing structure 21.

The peripheral portion 25 further includes a radial inner surface 28 and a radial outer surface 29 with each of the surfaces 28, 29 connecting the inner circumferential surface 26 to the outer circumferential surface 27 of the peripheral portion 25 around an entirety of the circumference of the peripheral portion 25. The radial inner surface 28 is configured to sealingly engage the outer circumferential surface 52 of the rotary component 50 and hence includes the same cylindrical curvature and shape as the outer circumferential surface 52. Specifically, the radial inner surface 28 has the profile shape of an arc of a circle having the same radius of curvature as the outer circumferential surface 52 of the rotary component 50 when viewed from the axial direction of the rotary component 50. The radial inner surface 28 further includes a substantially arcuate or hyperbolic profile shape when viewed from a direction tangential to the outer circumferential surface 52 of the rotary component 50 and perpendicular to the central axis of the hard sealing structure 21 due to the curvature of the peripheral portion 25 around the cylindrically shaped rotary component 50. The radial outer surface 29 includes substantially the same general shape as the radial inner surface 28 except the radial outer surface 29 includes a slightly larger radius of curvature when viewed from the axial direction of the rotary component 50 as measured from the axis of rotation thereof to space the radial outer surface 29 from the radial inner surface 28 in the radial direction of the rotary component 50 about the entirety of the peripheral portion 25.

In the illustrated embodiment, the inner circumferential surface 26 of the peripheral portion 25 is arranged to extend parallel to the axial direction of the hard sealing structure 21 about the entirety of the circumference of the peripheral portion 25. Similarly, the outer circumferential surface 27 of the peripheral portion 25 is also arranged to extend parallel to the axial direction of the hard sealing structure 21 about the entirety of the circumference of the peripheral portion 25. This relationship causes the inner circumferential surface 26 to be substantially equally spaced from the outer circumferential surface 27 with respect to any radial direction of the hard sealing structure 21 as measured from the central axis thereof about the entirety of the circumference of the peripheral portion 25, wherein this radial distance is hereinafter referred to as a radial thickness of the peripheral portion 25 of the hard sealing structure 21. Additionally, the hard sealing structure 21 is also arranged in a manner wherein the radial inner surface 28 is equally spaced from the radial outer surface 29 with respect to any axially extending direction passing through the peripheral portion 25, wherein this axial distance between the surfaces 28, 29 is hereinafter referred to as the axial thickness of the peripheral portion 25 of the hard sealing structure 21. However, it should be apparent to one skilled in the art that the consistently equal radial thickness and axial thickness of the peripheral portion 25 is not necessarily required for successful operation of the hard sealing structure 21 in providing the desired fluid-tight seals with the rotary component 50 and the soft sealing structure 22. For example, one, either, or both of the inner circumferential surface 26 and the outer circumferential surface 27 may be tapered radially inwardly or radially outwardly as the surfaces 26, 27 extend in the axial direction of the hard sealing structure 21 away from the outer circumferential surface 52 of the rotary component 50, as desired, for generating the desired forces acting on the hard sealing structure 21 when in sealing contact with the rotary component 50 and the soft sealing structure 22.

The hard sealing structure 21 further includes a piloting feature 31 and a retention feature 35 projecting from diametrically opposing sides of the peripheral portion 25 in alignment with each other with respect to the axial direction of the rotary valve 10. The piloting feature 31 is disposed adjacent the first end 61 of the valve body 60 and the retention feature 35 is disposed adjacent the second end 62 of the valve body 60. The piloting feature 31 includes a tapered surface 32 tapering in the radially outward direction of the rotary valve 10 as the piloting feature 31 extends away from the peripheral portion 25 with respect to the radial outward direction of the hard sealing structure 21 to cause the piloting feature 31 to include a substantially triangular cross-sectional shape when viewed from the tangential direction of the rotary component 50. The retention feature 35 is configured for reception within the retention indentation 78 of a corresponding one of the pockets 72 when the sealing assembly 20 is received within the corresponding one of the pockets 72. The retention feature 35 is shown as including a substantially symmetric configuration relative to the piloting feature 31 and similarly includes a tapered surface 36 that tapers in the radial outward direction of the rotary valve 10 as the retention feature projects radially outwardly from the central axis of the hard sealing structure 21 to again form a substantially triangular cross-sectional shape for the retention feature 35. The tapered surface 36 of the retention feature 35 is configured to bear against the retention lip 79 of the corresponding one of the pockets 72 during assembly of the rotary valve 10.

The hard sealing structure 21 is formed from a substantially rigid material such as a relatively rigid and relatively hard thermoplastic material. More specifically, the selected material may desirably be a semi-crystalline thermoplastic. If a thermoplastic material is utilized, the thermoplastic material may preferably be polyphthalamide (PPA) or polyphenylene sulfide (PPS). It may be preferable to utilize either of PPA or PPS due to each of the materials having a relatively strong chemical resistance, heat resistance, and resistance to permanent deformation or abrasion. Additionally, each of PPA and PPS can be provided as thermoplastic resins that are capable of being injection molded for forming the above described shape and configuration of the hard sealing structure 21 using a relatively inexpensive manufacturing process while remaining within the desired tolerances for establishing the desired sealing engagement with the outer circumferential surface 52 of the rotary component 50. Other rigid thermoplastic materials may be utilized for forming the hard sealing structure 21, such as polytetrafluoroethylene (PTFE), although PTFE is incapable of being manufactured using an injection molding process, hence a more expensive and difficult manufacturing process is required to properly form the hard sealing structure 21 to the desired configuration for providing the fluid-tight seal with the outer circumferential surface 52 of the rotary component 50. Additional rigid materials may also be utilized for forming the hard sealing structure 21 as well, including various metals, various ceramics, carbon graphite, and even glass, depending on the application specific requirements for the associated rotary valve 10. However, once again, such alternative materials other than the preferable thermoplastic materials listed above may be cost prohibitive or increasingly difficult to manufacture within the desired tolerances for maintaining the fluid-tight seal between the hard sealing structure 21 and the rotary component 50.

The hard sealing structure 21 may require a limited degree of compliancy to allow the hard sealing structure 21 to conform to any surface irregularities or dimensional inconsistencies present in the rotary component 50 to ensure that the desired sealing effect is present regardless of the rotational position of the rotary component 50. The rigidity of the preferred thermoplastic materials such as PPA or PPS may require the hard sealing structure 21 to be formed with a minimal cross-section around the circumference of the peripheral portion 25 to ensure the desired degree of compliance and conformity. The peripheral portion 25 of the hard sealing structure 21 may be provided to include a radial thickness of 3 mm or less and an axial thickness of 3 mm or less to ensure the desired degree of compliance and conformity thereof. For example, the peripheral portion 25 may be provided with a radial thickness of about 2 mm and an axial thickness of about 2 mm.

The rotary component 50, and specifically the portion of the rotary component 50 forming the outer circumferential surface 52 thereof, may be formed from the same materials described as being suitable for forming the hard sealing structure 21. For example, the rotary component 50 may be formed from a rigid thermoplastic material such as PPA or PPS, as non-limiting examples. In some embodiments, the same material may be selected to form each of the rotary component 50 and the hard sealing structure 21. However, any rigid material may be selected to form the rotary component 50 without necessarily departing from the scope of the present invention.

The soft sealing structure 22 has a shape substantially complimentary to that of each of the pockets 72 formed in the valve body 60 to allow for the soft sealing structure 22 to be received within a corresponding one of the pockets 72 in a manner preventing motion of the soft sealing structure 22 in the radial or circumferential directions of the valve body 60. In the illustrated embodiment, the soft sealing structure 22 includes a pair of lateral surfaces 38 with each of the lateral surfaces 38 configured to compliment a corresponding one of the lateral surfaces 75 of the corresponding one of the pockets 72. Each of the lateral surfaces 38 further includes a right-angled indentation 39 configured to compliment a retaining shoulders 76 of the corresponding one of the lateral surfaces 75, wherein the complimentary shapes of the indentations 39 and the retaining shoulders 76 prevent radial inward motion of the soft sealing structure 22 when received within the corresponding one of the pockets 72. The soft sealing structure 22 further includes a radial outer surface 40 complimentary to and engaging the radial end surface 73 of the corresponding one of the pockets 72 as well as an axial end surface 41 having a semi-cylindrical shape complimentary to and engaging the axial end surface 77 of the corresponding one of the pockets 72.

The soft sealing structure 22 includes a cylindrically shaped flow opening 44 formed therethrough as defined by an inner circumferential surface 43 thereof. As used hereinafter, the radial direction of the rotary valve 10 extending through the center of the flow opening 44 also represents a central axis of the soft sealing structure 22, hence references to the axial direction of the soft sealing structure 22 refers to those directions arranged parallel to the described central axis thereof. The flow opening 44 accordingly includes a circular profile shape when viewed in the axial direction of the soft sealing structure 22. The flow opening 44 formed through the soft sealing structure 22 includes a slightly reduced radius relative to the flow opening 24 formed through the hard sealing structure 21 to ensure that the radial outer surface 29 of the hard sealing structure 21 bears against the soft sealing structure 22 when the sealing assembly 20 is placed in the operational position thereof.

A radial inner surface 45 of the soft sealing structure 22 includes a curved cylindrical shape with a slightly larger radius of curvature than the radial inner surface 28 of the hard sealing structure 21. The radial inner surface 45 further includes an axial indentation 46 formed therein having a shape complimentary to a profile shape of the hard sealing structure 21 with respect to the axial direction thereof. The axial indentation 46 includes a depth in the axial direction of the soft sealing structure 22 that is less than the axial thickness of the hard sealing structure 21 to allow for the radial inner surface 28 of the hard sealing structure 21 to be disposed radially inwardly of the remainder of the radial inner surface 45 of the soft sealing structure 22 with respect to the radial direction of the rotary valve 10 to ensure that the soft sealing structure 22 does not engage the outer circumferential surface 52 of the rotary component 50 when the sealing assembly 20 is disposed within the corresponding one of the pockets 72 of the valve body 60. The retention feature 35 extends outside of the axial indentation 46 with respect to the axial direction of the valve body 10 to ensure that the retention feature 35 is received within the retention indentation 78 formed in the valve body 60 at a position external to the soft sealing structure 22. The axial indentation 46 forms a locating and retaining feature of the soft sealing structure 22 for preventing undesired motion of the hard sealing structure 21 relative thereto.

As suggested by the given names, the hard sealing structure 21 is formed from a material that is harder and stiffer than the material selected for forming the soft sealing structure 22. More specifically, the soft sealing structure 22 is formed from a relatively soft material that is resiliently deformable. As used herein, a resiliently deformable material is a material that can be deformed in such a way that the material attempts to return to its original position following deformation thereof, and especially when the material is compressed to be reduced in dimension in a given direction. The resiliency of the material selected for the soft sealing structure 22 should be such that the material applies a radially inward spring force to the hard sealing structure 21 in response to the soft sealing structure 22 being compressed in the radial outward direction towards the circumferential wall 69, wherein the radial force and radial direction of compression refer to the radial direction of the rotary valve 10. The resiliently deformable material may preferably be an elastomeric material such as Santoprene® thermoplastic elastomer, ethylene propylene diene monomer (EPDM) rubber, Nylabond® thermoplastic elastomer, EPDM foam, silicone rubber, nitrile, or urethane, as non-limiting examples. The elastomeric material may be selected based on the type of fluid and operating characteristics of the fluid being communicated through the rotary valve 10, such as including a desired chemical resistance and heat resistance. In a preferred embodiment, the elastomeric material may be selected to be a low durometer, 35-45 shore A, soft seal rubber to provide a low spring force to displacement ratio with respect to the soft sealing structure 22. The use of the low durometer material also aids in addressing concerns relating to tolerance stack-up in any given direction, including the radial direction of the rotary valve 10, because of the low force to displacement ration allows for larger and more manufacturing friendly tolerances to be used in forming each of the seal assemblies 20.

The rigid material forming the hard sealing structure 21 is selected to include a lower co-efficient of friction than the resilient and soft material selected for forming the soft sealing structure 22. As such, the rotation of the rotary component 50 via the corresponding rotary motor or actuator requires less torque to overcome the frictional forces present between the radial inner surface 28 of the hard sealing structure 21 and the outer circumferential surface 52 of the rotary component 50 than would be the case if the soft sealing structure 22 were placed in direct contact with the rotary component 50 during the rotation thereof.

The rotary valve 10 is assembled as follows. First, each of the hard sealing structures 21 is received within the axial indentation 46 of a corresponding one of the soft seal structures 22 to form each of the plurality of the seal assemblies 20. Each of the seal assemblies 20 is then inserted into a corresponding one of the pockets 72 of the valve body 60 with respect to the axial direction of the valve body 60. The axial insertion of each of the seal assemblies 20 into the valve body 60 establishes a fixed position of each of the soft seal structures 22 within each of the corresponding pockets 72 while the retention feature 35 of each of the hard sealing structures 21 is also axially inserted into each of the corresponding retention indentations 78.

The rotary component 50 is then centered relative to the valve body 60 before being axially inserted into the opening 67 of the valve body 60. Prior to the axial insertion of the rotary component 50, the radial inner surface 28 of each of the circumferentially spaced hard sealing structures 21 is positioned slightly radially inward of the radial position of the outer circumferential surface 52 of the rotary component 50. The piloting features 31 projecting axially from each of the hard sealing structures 21 aid in guiding and centering the rotary component 50 during the axial insertion thereof into the valve body 60. The outer circumferential surface 52 of the rotary component 50 bears against the tapered surface 32 of each of the piloting features 31 and continues to slide axially along each of the tapered surfaces 32 in a manner tending to force each of the hard sealing structures 21 in the radially outward direction of the rotary valve 10 until the outer circumferential surface 52 of the rotary component 50 is engaging each of the radial inner surfaces 28 of the hard sealing structures 21. Each of the retention lips 79 formed in the valve body 60 bears against the retention feature 35 of each of the hard sealing structures 21 to prevent an undesired inward rotation of the hard sealing structures 21 adjacent the second end 62 of the valve body 60 during the axial insertion of the rotary component 50 into the valve body 60. Once the rotary component 50 is fully received within the valve body 60, each of the soft sealing structures 22 is compressed in the radially outward direction of the rotary valve 10 to establish the fluid-tight seal between the valve body 60 and each of the soft sealing structures 22. The resiliency of each of the soft sealing structures 22 in turn provides an opposing radial inward force to each of the hard sealing structures 21 for establishing the fluid-tight seal between the outer circumferential surface 52 of the rotary component 50 and each of the radial inner surfaces 28 of the hard sealing structures 21.

The stem 56 of the rotary component 50 is inserted into the opening 64 of the cover 63 with each of the aforementioned O-rings 65, 66 positioned between the cover 63 and the first end 61 of the valve body 60. The cover 63 is then securely coupled to the valve body 60 to compress the O-rings 65, 66 in the desired manner for preventing leakage of the associated fluid from the rotary valve 10.

When in the fully assembled position, the flow opening 24 through the hard sealing structure 21 cooperates with the flow opening 44 through the soft sealing structure 22 to provide fluid communication between any radially aligned end 55 of one of the passageways 54 formed through the rotary component 50 and a corresponding fluid port 82 formed through the valve body 60. Each of the sealing assemblies 20 having the corresponding fluid passing therethrough establishes the necessary fluid-tight seals for preventing any leakage of the fluid outside of the desired flow path of the fluid. The rotary actuator or motor can rotate the rotary component 50 to any of a variety of different rotational positions relative to the valve body 60 with each of the sealing assemblies 20 maintaining the fluid-tight sealing effect both during and after the rotation of the rotary component 50 due to the continuous spring force applied by each of the soft sealing structures 22 to the corresponding hard sealing structures 21.

The rotary valve 10 as shown and described includes several advantageous features. The use of a rigid material having a lower co-efficient of friction than a resilient and soft material for engaging the rotary component 50 allows for the rotary component 50 to rotate more easily relative to each of the sealing assemblies 20. Additionally, the radial inner surface 28 of the hard sealing structure 21 has a minimized surface area in sealing engagement with the rotary component 50 due to the relatively small radial thickness of the peripheral portion 25 of the hard sealing structure 21 to further minimize the frictional forces present during the rotation of the rotary component 50. Each of the aforementioned advantages leads to the corresponding rotary motor or actuator requiring less torque to rotate the rotary component 50 in the desired manner. The reduced torque requirement beneficially expands the suitable rotary motors or actuators capable for use with the rotary valve 10 while also reducing the amount of energy required to rotate the rotary component 50 relative to the valve body 60. The lower torque requirement may also beneficially allow for the rotary motor or actuator to be smaller in size to reduce a packaging space of the assembly including the rotary valve 10.

In addition to minimizing the frictional forces present between the radial inner surface 28 of the hard sealing structure 21 and the outer circumferential surface 52 of the rotary component 50, the relatively small surface area of the radial inner surface 28 engaging the outer circumferential surface 52 also promotes a high contact force present therebetween for the given surface area in a manner ensuring the desired fluid-tight seal between the hard sealing structure 21 and the rotary component 50. The high contact force acting along the relatively small surface area present between the engaging components further causes the hard sealing structure 21 to comply accordingly to any scratches or other dimensional inconsistencies formed in the rotary component 50 despite the relatively high degree of rigidity of the hard sealing structure 21 in comparison to the traditional use of an elastomeric material for making such sealing engagement.

The use of the piloting features 31 formed at one end of each of the hard sealing structures 21 also aids in assembling the rotary valve 10 in a manner establishing the desired radial forces for forming each of the described fluid-tight seals. Additionally, the manner in which the rotary component 50 progressively compresses each of the soft sealing structures 22 via each of the intervening hard sealing structures 21 also prevents any dimensional variations present in either of the sealing structures 21, 22 from disrupting proper operation of the rotary valve 10. The addition of the retention feature 35 to each of the hard sealing structures 21 further simplifies the assembly of the rotary valve 10 by preventing undesired motion of each of the hard sealing structures 21 while also establishing a desired radial position of each of the sealing assemblies 20.

The materials described as being suitable for forming the hard sealing structure 21 and the soft sealing structure 22 of each of the sealing assemblies 20 also facilitates the use of an injection molding operation for forming each of the sealing structures 21, 22. This lowers the cost and simplifies the manufacturing of each of the sealing assemblies 20 in comparison to other related manufacturing processes.

Referring now to FIGS. 7-14, a sealing assembly 120 for use in a rotary valve 110 according to another embodiment of the invention is shown and described. The rotary valve 110 once again generally includes a rotary component 150, a valve body 160, and a plurality of sealing assemblies 120 for providing a fluid-tight seal between the rotary component 150 and the valve body 160 at circumferentially spaced positions around the rotary component 150.

Figure 11:
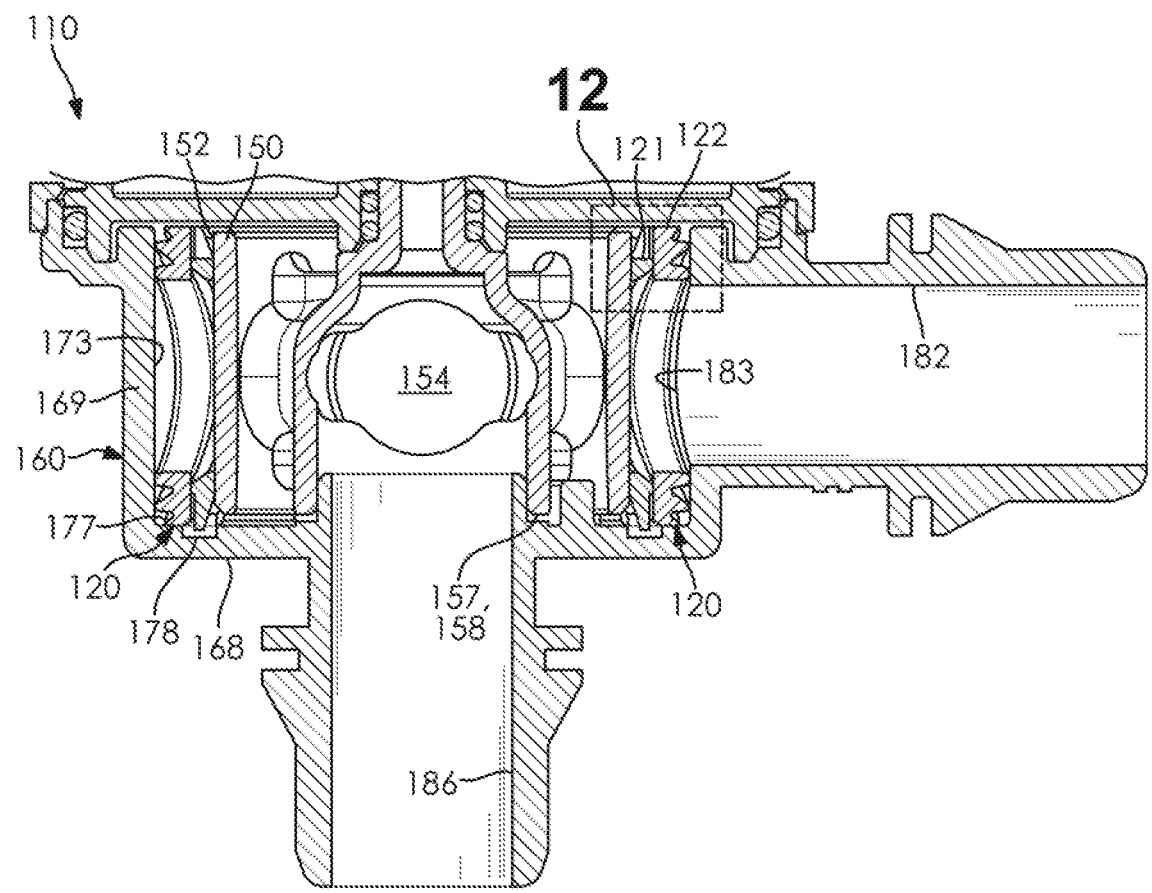
FIG. 11 is a cross-sectional elevational view of a rotary valve according to another embodiment of the present invention as taken along a plane parallel to an axis of rotation of a rotary component of the rotary valve.
Figure 13:
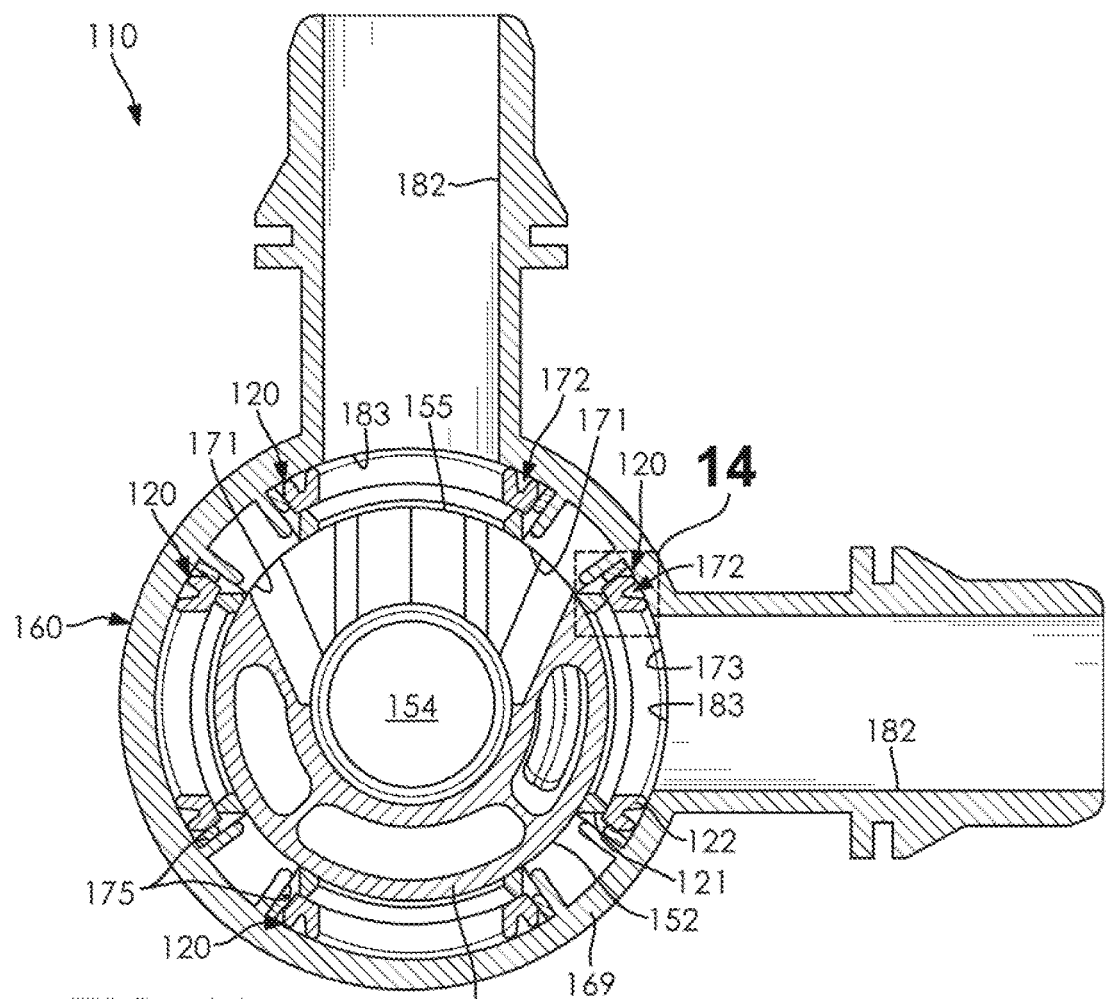
FIG. 13 is a cross-sectional view of the rotary valve of FIG. 11 as taken along a plane perpendicular to the axis of rotation of the rotary component.

As is evident from review of FIGS. 11 and 13, the rotary valve 110 includes a substantially different flow configuration from the rotary valve 10 of FIGS. 1-4. Specifically, the valve body 160 of the rotary valve 110 includes a circumferential wall 169 having only two radially extending fluid ports 182 rather than the four radially extending fluid ports 82 shown with respect to the rotary valve 10. Each of the radially extending fluid ports 182 includes a radial innermost end 183 intersecting an inner circumferential surface 170 of the circumferential wall 169. The inner circumferential surface 170 is divided into a plurality of cylindrical segments 171 and a plurality of pockets 172 interposed between adjacent ones of the cylindrical segments 171. Each of the pockets 172 differs from the pockets 72 of the valve body 10 in that a radial end surface 173 of each of the pockets 172 has a cylindrical curvature and shape with a radius of curvature thereof measured from an axis of rotation of the rotary valve 110. Each of the pockets 172 further includes a pair of opposing lateral surfaces 175 arranged in corresponding radial directions of the rotary valve 110. The radial end surface 173 and each of the lateral surfaces 175 of each of the pockets 172 is arranged to extend in the axial direction of the rotary valve 110. An axial end surface 177 of each of the pockets 172 is arranged perpendicular to the axial direction of the rotary valve 110 rather than including a semi-cylindrical shape as is disclosed with respect to the axial end surfaces 77 present in the rotary valve 10. The axial end surface 177 of each of the pockets 172 further includes a retention indentation 178 formed therein and extending in the axial direction into the valve body 160.

An end wall 168 of the valve body 160 includes an axially extending fluid port 186 arranged along the central axis of the rotary valve 110 as defined by an axis of rotation of the rotary component 150. The rotary component 150 includes a single passageway 154 formed therethrough with one of the ends 155 of the passageway 154 intersecting an outer circumferential wall 152 of the rotary component 150 and an opposing end 157 of the passageway 154 terminating at an axial end 158 of the rotary component 150 in alignment with the axially extending fluid port 186. The rotary valve 110 is accordingly configured to allow for a 90 degree turn of the fluid passing therethrough with the rotary component 150 switchable between the two different radially extending fluid ports 182 in fluid communication with the axially extending fluid port 186. The rotary component 150 is once again operably coupled to a suitable rotary motor or actuator (not shown) capable of rotating the rotary component 150 between the two different rotational positions.

Figure 7:
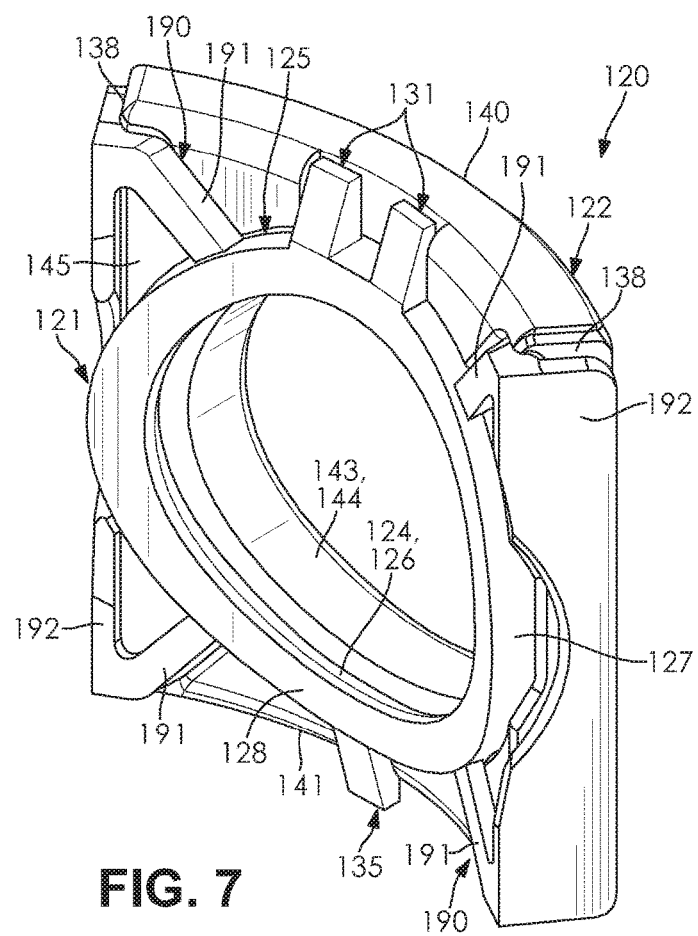
FIG. 7 is a front perspective view of a sealing assembly according to another embodiment of the present invention.
Figure 8:
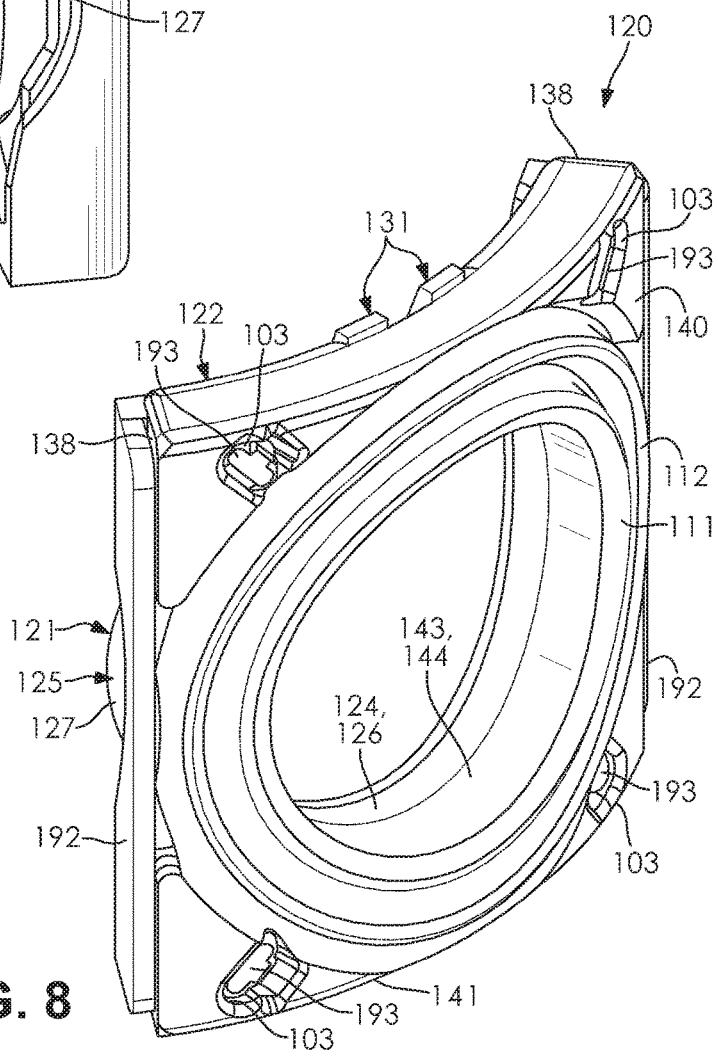
FIG. 8 is a rear perspective view of the sealing assembly of FIG. 7.
Figure 9:
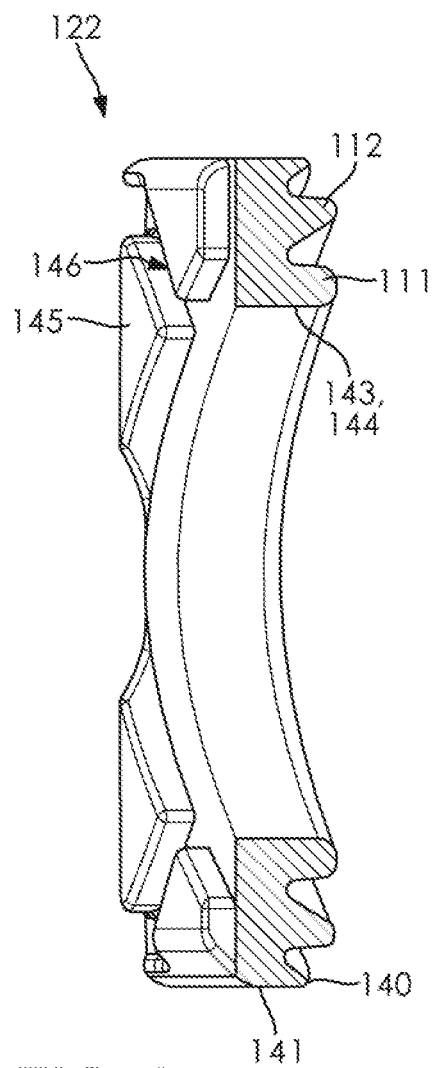
FIG. 9 is a cross-sectional elevational view of a soft sealing structure of the sealing assembly of FIGS. 7 and 8 as taken through a first plane passing through opposing sides of the soft sealing structure.
Figure 10:
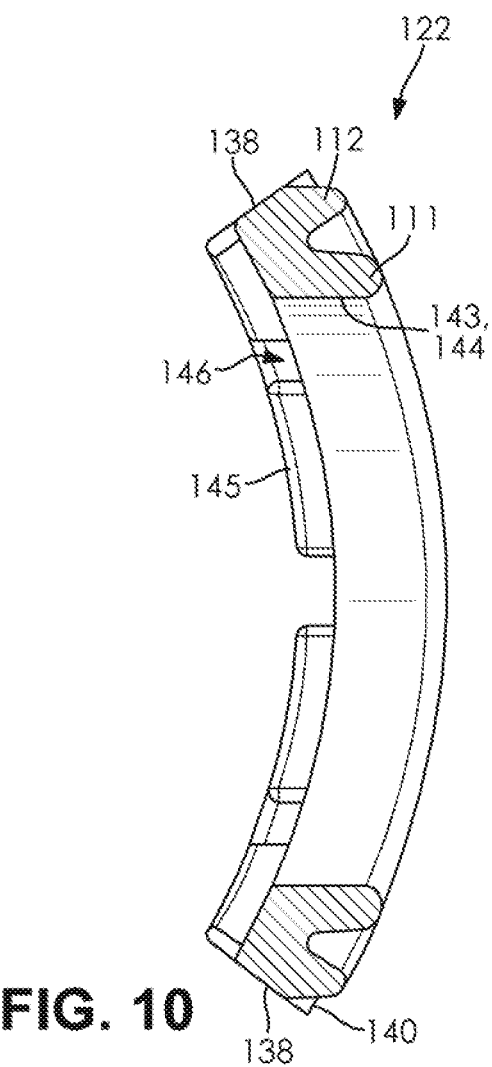
FIG. 10 is a cross-sectional view of the sealing structure of the sealing assembly of FIGS. 7 and 8 as taken through a second plane arranged perpendicular to the first plane of FIG. 9.

Referring to FIGS. 7 and 8, one of the sealing assemblies 120 suitable for use with the rotary valve 110 is disclosed in isolation. The sealing assembly 120 is substantially similar to the sealing assembly 20 in many respects, but differs by virtue of several modifications and additions in comparison to the sealing assembly 20. The sealing assembly 120 includes a hard sealing structure 121 and a soft sealing structure 122, each of which may be formed from the same materials described as suitable for forming the hard sealing structure 21 and the soft sealing structure 22.

The hard sealing structure 121 includes a peripheral portion 125 including an inner circumferential surface 126, an opposing outer circumferential surface 127, a radial inner surface 128 configured to engage the outer circumferential surface 152 of the rotary component 150, and a radial outer surface 129 (FIGS. 12 and 14) opposing the radial inner surface 128 and configured to engage the soft sealing structure 122. The inner circumferential surface 126 defines a flow opening 124 through the hard sealing structure 121 substantially corresponding in size and shape to each of the radially extending fluid ports 182 formed through the valve body 160 as well as the radially extending end 155 of the passageway 154 formed through the rotary component 150. A radial direction of the rotary component 150 passing through a center of the flow opening 124 defines a central axis of the hard sealing structure 121, hence references to an axial direction of the hard sealing structure 121 hereinafter refer to directions parallel to the central axis thereof. Furthermore, references to a radial direction of the hard sealing structure 121 also refer to those directions passing through the central axis thereof and arranged perpendicular thereto.

The radial inner surface 128 is substantially similar to the radial inner surface 28 of the hard sealing structure 21 and includes a curved cylindrical shape complimentary to the cylindrical shape of the outer circumferential surface 152 of the rotary component 150. The outer circumferential surface 127 extends in the axial direction of the hard sealing structure 121 and is also substantially similar to the outer circumferential surface 27 of the hard sealing structure 21.

However, the inner circumferential surface 126 and the radial outer surface 129 of the hard sealing structure 121 differ from the corresponding surfaces 26, 29 of the hard sealing structure 21 as a result of a reducing radial thickness of the peripheral portion 125 as the peripheral portion 125 extends in a radial outward direction of the rotary valve 110 coinciding with the axial direction of the hard sealing structure 121. More specifically, at least a portion of the inner circumferential surface 126 is tapered towards the radial outer surface 129 to cause the radial outer surface 129 to include a reduced radial thickness relative to the radial inner surface 128. The radial outer surface 129 of the peripheral portion 125 accordingly includes a smaller surface area than the radial inner surface 128 thereof.

The hard sealing structure 121 includes a pair of laterally spaced apart piloting features 131 and a retention feature 135 projecting from diametrically opposing sides of the peripheral portion 125 with respect to the axial direction of the rotary valve 110. Other than being spaced apart and provided as a pair, each of the piloting features 131 is similar in structure and purpose to the piloting feature 31 of the hard sealing structure 21, hence further description thereof is omitted. Similarly, the retention feature 135 is similar in structure and purpose to the retention feature 35 of the hard sealing structure 21, hence further description thereof is also omitted.

The hard sealing structure 121 further includes a pair of lateral frame members 190 extending from opposing lateral sides of the peripheral portion 125. Each of the frame members 190 includes a pair of connecting portions 191 extending at least partially radially outwardly from the outer circumferential surface 127 of the peripheral portion 125 with respect to the radial direction of the hard sealing structure 121. Each of the pairs of the connecting portions 191 connects the peripheral portion 125 to a corresponding lateral wall 192 of one of the frame members 190. Each of the lateral walls 192 project away from the corresponding pair of the connecting portions 191 in a direction corresponding to a radial direction of the rotary valve 110 when the sealing assembly 120 is received within the valve body 160 as described hereinafter. Each of the connecting portions 191 further includes a coupling projection 193 (FIG. 8) extending therefrom in either of the axial direction of the hard sealing structure 121 of a direction corresponding to a radial outward direction of the rotary valve 110 when the sealing assembly 120 is received within the valve body 160.

The soft sealing structure 122 serves substantially the same purpose as the soft sealing structure 22, but includes a different configuration to accommodate the changes in the structure of the valve body 160 and the hard sealing structure 121 from the valve body 60 and the hard sealing structure 21 as noted hereinabove. The soft sealing structure 122 also includes an improved double-sealing surface for engaging the circumferential wall 169 of the valve body 160 as described hereinafter.

The soft sealing structure 122 has a shape substantially complimentary to that of each of the pockets 172 formed in the valve body 160. In the illustrated embodiment, the soft sealing structure 122 includes a pair of lateral surfaces 138 with each of the lateral surfaces 138 extending in the axial and radial directions of the valve body 110 when the soft sealing structure 122 is received within one of the pockets 172. The soft sealing structure 122 includes a radial outer surface 140 having a generally cylindrical shape with a radius of curvature greater than that of the outer circumferential surface 152 of the rotary component 150. The soft sealing structure 122 also includes a substantially planar axial end surface 141 arranged perpendicular to the axial direction of the rotary valve 110 and configured to engage the axial end surface 177 of the corresponding one of the pockets 172.

The soft sealing structure 122 includes a cylindrically shaped flow opening 144 formed therethrough as defined by an inner circumferential surface 143 thereof. As used hereinafter, a radial direction of the rotary valve 110 extending through the center of the flow opening 144 also represents a central axis of the soft sealing structure 122, hence references to the axial direction of the soft sealing structure 122 refer to those directions arranged parallel to the described central axis thereof. The flow opening 144 accordingly includes a circular profile shape when viewed in the axial direction of the soft sealing structure 122. The flow opening 144 formed through the soft sealing structure 122 is dimensioned to ensure that the radial outer surface 129 of the hard sealing structure 121 bears against the soft sealing structure 122 when the sealing assembly 120 is placed in the operational position thereof.

A radial inner surface 145 of the soft sealing structure 122 includes a cylindrical shape with a slightly larger radius of curvature than the radial inner surface 128 of the hard sealing structure 121. The radial inner surface 145 further includes an axial indentation 146 formed therein having a shape complimentary to a profile shape of the hard sealing structure 121 with respect to the axial direction thereof. The axial indentation 146 includes a depth in the axial direction of the soft sealing structure 122 that is less than the axial thickness of the hard sealing structure 121 to allow for the radial inner surface 128 of the hard sealing structure 121 to be disposed radially inwardly of the remainder of the radial inner surface 145 of the soft sealing structure 122 to ensure that the soft sealing structure 122 does not engage the outer circumferential surface 152 of the rotary component 150 when the sealing assembly 120 is disposed within the corresponding one of the pockets 172 of the valve body 160. The retention feature 135 extends outside of the axial indentation 146 with respect to the axial direction of the valve body 110 to ensure that the retention feature 135 is received within the retention indentation 178 formed in the valve body 160 at a position external to the soft sealing structure 122. The axial indentation 146 forms a locating feature of the soft sealing structure 122 for preventing undesired motion of the hard sealing structure 121 relative thereto.

A plurality of coupling openings 103 are formed in the radial inner surface 145 of the soft sealing structure 122 towards the radial outer surface 140 thereof. The coupling openings 103 are shown as extending through the soft sealing structure 122 in FIG. 8, but any depth of the coupling openings 103 may be utilized without necessarily departing from the scope of the present invention. Each of the coupling openings 103 may extend into the soft sealing structure 122 in either of the axial direction of the soft sealing structure 122 or a corresponding radial direction of the rotary valve 110, as desired. Each of the coupling openings 103 is positioned and dimensioned to receive a corresponding one of the coupling projections 193 therein when the hard sealing structure 121 is engaged with the soft sealing structure 122.

The radial outer surface 140 of the soft sealing structure 122 differs substantially from the corresponding radial outer surface 40 of the soft sealing structure 22 due to the inclusion of a pair of sealing lips 111, 112 projecting therefrom in the axial direction of the soft sealing structure 122 with each of the sealing lips 111, 112 configured to sealingly engage the radial end surface 173 of the corresponding one of the pockets 172. More specifically, a first sealing lip 111 is disposed immediately adjacent the flow opening 144 through the soft sealing structure 122 while a second sealing lip 112 is disposed radially outwardly of the first sealing lip 111 with respect to the radial direction of the soft sealing structure 122. Each of the sealing lips 111, 112 may include a substantially arcuate tip for engaging the corresponding radial end surface 173, but other shapes may also be used without departing from the scope of the present invention. Each of the sealing lips 111, 112 extend annularly around the flow opening 144 for forming two radially spaced apart sealing surfaces around the flow opening 144, thereby providing for an additional and independently provided sealing surface for preventing leakage between the radial innermost end 183 of the corresponding fluid port 182 and the radial outer surface 140 of the soft sealing structure 122. Each of the sealing lips 111, 112 includes a circular profile shape when viewed from the axial direction of the soft sealing structure 122, but alternative shapes may be utilized if the corresponding flow opening 144 is provided to include a different shape from that shown and described.

The first sealing lip 111 includes an inner circumferential surface 113 and an opposing outer circumferential surface 114 while the second sealing lip 112 also includes an inner circumferential surface 115 and an opposing outer circumferential surface 116. The inner circumferential surface 113 of the first sealing lip 111 may coincide with the inner circumferential surface 143 of the soft sealing structure 122 defining the flow opening 144 therethrough, hence the inner circumferential surface 113 may extend in the axial direction of the soft sealing structure 122.

Figure 12:
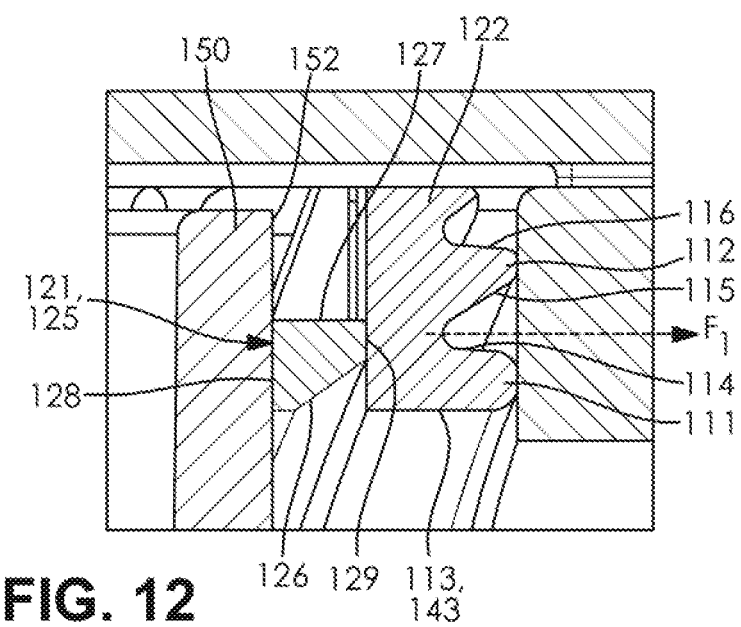
FIG. 12 is an enlarged fragmentary cross-sectional elevational view of the boxed portion of FIG. 11.
Figure 14:
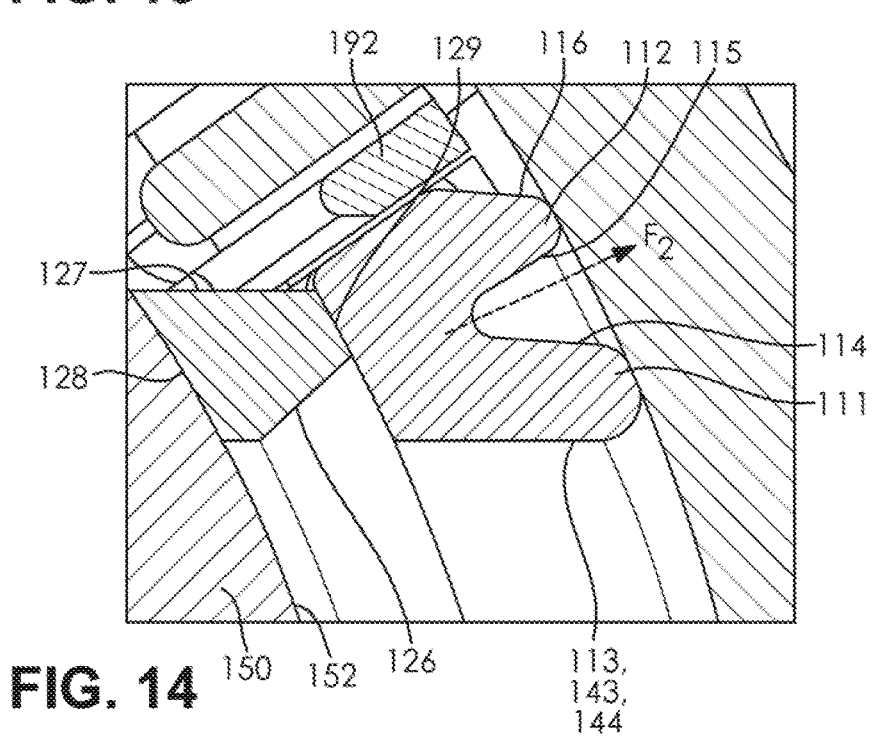
FIG. 14 is an enlarged fragmentary cross-sectional elevational view of the boxed portion of FIG. 13.

Referring now to FIG. 12, a vector $F_1$ is shown as extending between the outer circumferential surface 114 of the first sealing lip 111 and the inner circumferential surface 115 of the second sealing lip 112. FIG. 14 shows a vector $F_2$ extending between the outer circumferential surface 114 of the first sealing lip 111 and the inner circumferential surface 115 of the second sealing lip 112 at a position rotationally spaced about 90 degrees from the position of the vector $F_1$ with respect to the central axis of the soft sealing structure 122. Each of the vectors $F_1$, $F_2$ is arranged to extend in spaced apart radial directions of the rotary valve 110 extending from the axis of rotation of the rotary component 150 and arranged perpendicular thereto. Due to the manner in which the soft sealing structure 122 is compressed between the outer circumferential surface 152 of the rotary component 150 via the hard sealing structure 121 and the radial end surface 173 of the corresponding pocket 172, each of the vectors $F_1$, $F_2$ are representative of a direction of the compressive forces acting on the soft sealing structure 122 at the identified locations with each of the vectors $F_1$, $F_2$ arranged perpendicular to the outer circumferential surface 152 and the radial end surface 173 at the locations each of the vectors $F_1$, $F_2$ pass through.

As shown in FIG. 12, the outer circumferential surface 114 of the first sealing lip 111 is inclined away from the vector $F_1$ at an angle of at least 1 degree while the inner circumferential surface 115 of the second sealing lip 112 is inclined away from the vector $F_1$ at an opposing angle of at least 1 degree. Similarly, despite the spacing of the vector $F_2$ from the vector $F_1$ and the perpendicular arrangement of the given cross-section of FIG. 14 from that of FIG. 12, the outer circumferential surface 114 of the first sealing lip 111 is inclined away from the vector $F_2$ at an angle of at least 1 degree while the inner circumferential surface 115 of the second sealing lip 112 is inclined away from the vector $F_2$ at an opposing angle of at least 1 degree. The inclination of the circumferential surfaces 114, 115 away from each of the vectors F1, F2 beneficially prevents an undesired buckling of each of the sealing lips 111, 112 towards one another during the compression of the soft sealing structure 122, wherein such buckling could interrupt the sealing effect provided by each of the sealing lips 111, 112. As such, two distinct and fluid-tight annular sealing surfaces are formed by the soft sealing structure 122 around the corresponding flow opening 144 formed therethrough.

Each of the sealing assemblies 120 is assembled by placing the hard sealing structure 121 within the axial indentation 146 formed in the radial inner surface 145 of the soft sealing structure 122. The coupling projections 193 of the hard sealing structure 121 are also received within the coupling openings 103 of the soft sealing structure 122 while the lateral walls 192 of each of the frame members 190 extend around and engage the lateral surfaces 138 of the soft sealing structure 122. The various different engagements between the hard sealing structure 121 and the soft sealing structure 122 maintains the positions of the structures 121, 122 relative to one another. Each of the sealing assemblies 120 is then able to be received within one of the pockets 172 of the valve body 160 via insertion with respect to the axial direction of the valve body 160. In contrast to the first embodiment of the invention, the lateral walls 192 associated with the hard sealing structure 121 are caused to engage the lateral surfaces 175 of the corresponding pocket 172 instead of the soft sealing structure 122. The rotary component 150 is once again axially received within the valve body 160 with the piloting features 131 performing a similar role in progressively compressing each of the soft sealing structures 122 for forming the desired radial forces between the rotary component 150, the hard sealing structure 121, the soft sealing structure 122, and the valve body 160.

The embodiment of the invention shown throughout FIGS. 7-14 provides numerous advantageous features. First, the manner in which the hard sealing structure 121 directly engages the valve body 160 via the frame members 190 improves the rigidity of the connection therebetween due to the increased rigidity of the material used to form the hard sealing structure 121 in comparison to the soft sealing structure 22. Second, as explained above, the use of the pair of the sealing lips 111, 122 of the soft sealing structure 122 doubles the sealing surfaces present between the soft sealing structure 122 and the valve body 160. Lastly, the tapering of the peripheral portion 125 towards the radial outer surface 129 thereof allows for greater dimensional inconsistencies to be introduced into the rotary valve 110 in the radial directions thereof. This occurs because the radial outer surface 129 includes a smaller surface area which causes the hard sealing structure 121 to more easily locally compress the soft sealing structure 122 in the radial direction of the rotary valve 110 to account for any variability of the dimensions of any of the interacting components, and especially those involved in the formation of each of the sealing assemblies 120. The relatively smaller surface area of the radial outer surface 129 minimizes the amount of surface area displaced into the soft sealing structure 122, which in turn lowers the resultant force curve present between the two components. This relationship allows for the soft sealing structure 122 to be formed relatively thinner for further minimizing the packaging space occupied by the rotary valve 110.

Figure 15:
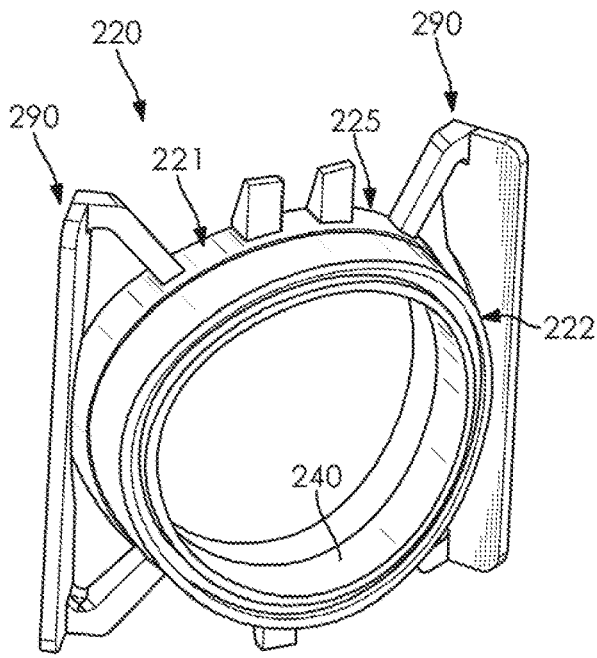
FIG. 15 is a rear perspective view of a sealing assembly according to yet another embodiment of the present invention.
Figure 16:
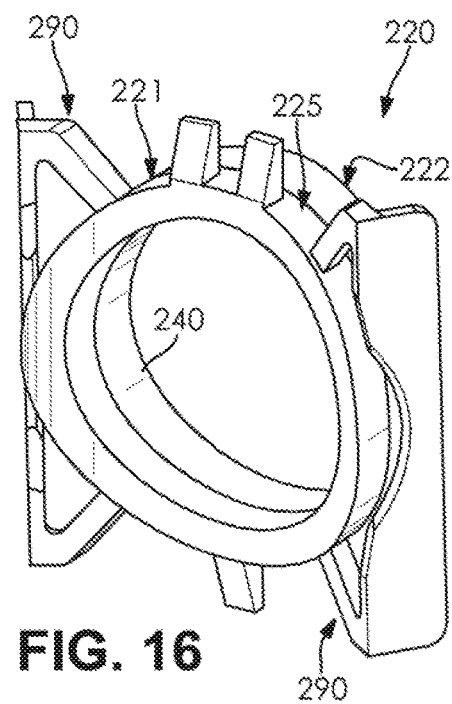
FIG. 16 is a front perspective view of the sealing assembly of FIG. 15.
Figure 17:
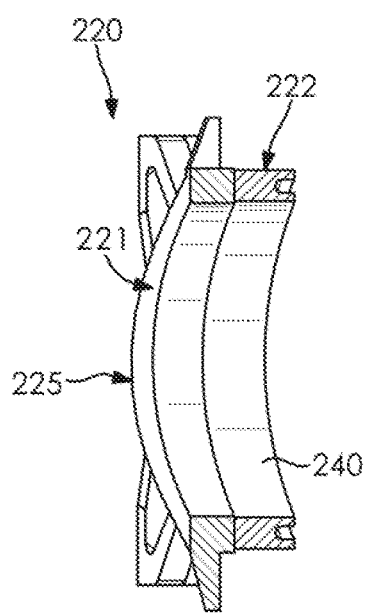
FIG. 17 is a cross-sectional elevational view of the sealing assembly of FIGS. 15 and 16 as taken through a plane passing through opposing sides of the sealing assembly.

Referring now to FIG. 15-17, a sealing assembly 220 according to a third embodiment of the invention is disclosed. As is apparent from the illustrations thereof, a hard sealing structure 221 of the sealing assembly 220 includes structures common to one or the other of the previously described hard sealing structures 21, 121, hence further description is largely omitted herein. The illustrated hard sealing structure 221 includes a pair of frame members 290 extending from a peripheral portion 225 thereof in a manner wherein the hard sealing structure 221 may be configured for reception within one of the pockets 172 illustrated with regards to the valve body 160 of the above described second embodiment.

The sealing assembly 220 differs from the previously described sealing assemblies 20, 120 primarily as a result of a method of manufacturing the sealing assembly 220. The sealing assembly 220 is formed in a two-shot injection molding process wherein a soft sealing structure 222 thereof is molded directly onto the hard sealing structure 221 via use of a single mold. The two structures 221, 222 are accordingly coupled to each other without requiring the various different locating and coupling features described hereinabove with reference to the sealing assemblies 20, 120. As a result, the soft sealing structure 222 may be produced with a simplified structure that does not need to correspond in shape and configuration to each of the hard sealing structure 221 and the corresponding valve body. In the provided example, the soft sealing structure 222 is provided merely as a cylindrical body engaging the peripheral portion 225 of the hard sealing structure 221 and having a central flow opening 240 defined by the cylindrical body. The sealing assembly 220 accordingly utilizes much less material than the previously described sealing assemblies 20, 120 while also reducing the number of specific features that must be formed in the sealing structures 221, 222 for meeting the sealing requirements of the associated rotary valve.

The novel features regarding the seal assemblies disclosed herein may also be readily adapted for use in any variety of related rotary valve configurations in addition to those shown and described herein. For example, although the seal assemblies shown and described herein are shown as being contoured for reception between a cylindrically shaped rotary component (plug) and a valve body having a cylindrically contoured inner surface, it should be understood that each of the seal assemblies disclosed herein may be contoured for reception within alternative shapes wherein the corresponding rotary component (plug) is caused to rotate about a central axis relative to an inner surface of a corresponding valve body. For example, each of the seal assemblies disclosed herein may be adapted for use with a conically shaped rotary component and a conically shaped inner surface of the corresponding valve body or for a ball valve configuration including a spherically shaped rotary component and a spherically shaped inner surface of the corresponding valve body, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A sealing assembly for a rotary valve having a rotary component configured to rotate relative to a valve body, the sealing assembly comprising:
   a first sealing structure configured to sealingly engage the rotary component, the first sealing structure formed from a substantially rigid material; and
   a second sealing structure configured to sealingly engage the first sealing structure and the valve body, the second sealing structure formed from a resiliently deformable material, wherein the second sealing structure includes an indentation formed therein configured to receive the first sealing structure, and wherein a portion of the first sealing structure configured to sealingly engage the rotary component is disposed outside of the indentation.

2. The sealing assembly of claim 1, wherein the substantially rigid material is a thermoplastic material.

3. The sealing assembly of claim 2, wherein the thermoplastic material is one of polyphthalamide or polyphenylene sulfide.

4. The sealing assembly of claim 1, wherein the resiliently deformable material is an elastomeric material.

5. The sealing assembly of claim 4, wherein the elastomeric material is one of a thermoplastic elastomer, ethylene propylene diene monomer (EPDM) rubber, EPDM foam, silicone rubber, nitrile, or urethane.

6. The sealing assembly of claim 1, wherein the substantially rigid material includes a lower co-efficient of friction than the resiliently deformable material.

7. The sealing assembly of claim 1, wherein the second sealing structure includes at least two sealing lips configured to sealingly engage the valve body, wherein each of the at least two sealing lips extends peripherally around a flow opening formed through the second sealing structure.

8. The sealing assembly of claim 1, wherein the first sealing structure includes a decreasing thickness in a direction towards the second sealing structure.

9. A rotary valve comprising:
a valve body including an opening formed therein;
a rotary component received within the opening of the valve body, the rotary component configured to rotate relative to the valve body about an axis of rotation thereof;
a first sealing structure configured to sealingly engage the rotary component, the first sealing structure formed from a substantially rigid material; and
a second sealing structure configured to sealingly engage the first sealing structure and the valve body, the second sealing structure formed from a resiliently deformable material, wherein the first sealing structure includes a tapered piloting feature configured to aid in installing the rotary component into the opening of the valve body.

10. The rotary valve of claim 9, wherein the second sealing structure is configured to sealingly engage an inner circumferential surface of the valve body partially defining the opening therein, and wherein the first sealing structure is configured to sealingly engage an outer circumferential surface of the rotary component.

11. The rotary valve of claim 10, wherein the inner circumferential surface of the valve body defines a pocket configured to receive the second sealing structure therein.

12. The rotary valve of claim 10, wherein the outer circumferential surface of the rotary component is one of cylindrical, conical, or spherical in shape.

13. The rotary valve of claim 9, wherein the first sealing structure includes a first flow opening formed therethrough and the second sealing structure includes a second flow opening formed therethrough, wherein the first flow opening and the second flow opening cooperate to provide fluid communication between a passageway formed through the rotary component and a fluid port formed through the valve body.

14. The rotary valve of claim 9, wherein the substantially rigid material is a thermoplastic material and the resiliently deformable material is an elastomeric material.

15. The rotary valve of claim 14, wherein the thermoplastic material is one of polyphthalamide or polyphenylene sulfide and the elastomeric material is one of a thermoplastic elastomer, ethylene propylene diene monomer (EPDM) rubber, EPDM foam, silicone rubber, nitrile, or urethane.

16. The rotary valve of claim 9, wherein the first sealing structure is formed from a same material as the rotary component.

17. The rotary valve of claim 9, wherein the first sealing structure includes a retention feature formed opposite the piloting feature thereof, and wherein the retention feature is configured to be received within a retention indentation formed in the valve body.

18. The rotary valve of claim 9, wherein the second sealing structure is compressed between the first sealing structure and the valve body, wherein the second sealing structure applies a spring force to the first sealing structure in a direction towards the rotary component.

* * * * *